US011692882B2

(12) United States Patent
Hudson

(10) Patent No.: US 11,692,882 B2
(45) Date of Patent: Jul. 4, 2023

(54) ELECTRICAL COMPONENT

(71) Applicant: GH INNOVATION LIMITED, Canterbury (GB)

(72) Inventor: Gary Hudson, Canterbury (GB)

(73) Assignee: IRISS HOLDINGS LLC, Bradenton, FL (US)

( * ) Notice: Subject to any disclaimer, the term of this patent is extended or adjusted under 35 U.S.C. 154(b) by 417 days.

(21) Appl. No.: 16/754,601

(22) PCT Filed: Oct. 9, 2018

(86) PCT No.: PCT/GB2018/052883
§ 371 (c)(1),
(2) Date: Apr. 8, 2020

(87) PCT Pub. No.: WO2019/073217
PCT Pub. Date: Apr. 18, 2019

(65) Prior Publication Data
US 2020/0284665 A1    Sep. 10, 2020

(30) Foreign Application Priority Data

Oct. 10, 2017 (GB) ...................................... 1716605

(51) Int. Cl.
G01K 11/00 (2006.01)
G01K 11/16 (2021.01)
(Continued)

(52) U.S. Cl.
CPC ................ *G01K 11/16* (2013.01); *C09K 9/02* (2013.01); *H01B 7/324* (2013.01); *H01R 13/46* (2013.01);
(Continued)

(58) Field of Classification Search
CPC .......... G01K 11/16; C09K 9/02; H01B 7/324; H01R 13/46; H01R 43/18; H02G 3/32
(Continued)

(56) References Cited

U.S. PATENT DOCUMENTS 5,922,996 A     7/1999 Ryeczek
2020/0284665 A1*  9/2020 Hudson .................. H01R 13/46

FOREIGN PATENT DOCUMENTS

GB       2538388 A      11/2016
JP       H0479175 A      3/1992
(Continued)

OTHER PUBLICATIONS

International Search Report and Written Opinion received in PCT/GB2018/052883 dated Feb. 12, 2019, pp. 10.

*Primary Examiner* — Khiem M Nguyen
(74) *Attorney, Agent, or Firm* — Liang & Hennessey LLP; Brian Hennessey

(57) ABSTRACT

An electrical component including a polymeric body which (i) defines at least one electrical connection; or (ii) is configured for attachment to an electrical cable or wire; or (iii) is configured for attachment to an electrical apparatus, wherein the polymeric body or a portion thereof includes a thermochromic composition which has a first colour condition below a first threshold temperature and a second colour condition if the composition is heated above the first threshold temperature, and wherein the thermochromic composition maintains the second colour condition until it is cooled below a second threshold temperature.

13 Claims, 2 Drawing Sheets

(51) Int. Cl.
   *C09K 9/02* (2006.01)
   *H01B 7/32* (2006.01)
   *H01R 13/46* (2006.01)
   *H01R 43/18* (2006.01)
   *H02G 3/32* (2006.01)

(52) U.S. Cl.
   CPC ............... *H01R 43/18* (2013.01); *H02G 3/32* (2013.01); *C09K 2211/10* (2013.01)

(58) Field of Classification Search
   USPC ....................................................... 374/162
   See application file for complete search history.

(56) References Cited

FOREIGN PATENT DOCUMENTS

| | | | |
|---|---|---|---|
| JP | 2007332232 | A | 12/2007 |
| JP | 2009198201 | A | 9/2009 |
| JP | 2011023309 | A | 2/2011 |
| WO | 2017037282 | A1 | 3/2017 |

\* cited by examiner

ELECTRICAL COMPONENT

CROSS-REFERENCE TO RELATED APPLICATIONS

The present application is a national phase application of PCT Application No. PCT/GB2018/052883, filed Oct. 9, 2018, entitled "AN ELECTRICAL COMPONENT", which claims the benefit of British Patent Application No. 1716605.9, filed Oct. 10, 2017, each of which is incorporated by reference in its entirety.

The subject application relates to electrical components, such as connectors and clips, and in particular to electrical components that change colour when heated or are subjected to heat beyond a pre-determined threshold temperature.

It is well known that the majority of electrical fires and malfunctions are as a result of faulty or damaged connectors. Such connectors overheat in use and can become an ignition point for a fire.

It is possible to check electrical connections, but such checks tend to be visual. Even the use of a heat sensor when carrying out the checks may not reveal potential problems if there is no electrical load on the relevant faulty connector at the time of the check.

The present invention aims to address the problem of detecting faults in electrical systems which may cause the relevant electrical components or apparatus to overheat and provide a fire risk.

According to a first aspect of the invention, there is provided an electrical component including a polymeric body which (i) defines at least one electrical connection; or (ii) is configured for attachment to an electrical cable or wire; or (iii) is configured for attachment to an electrical apparatus, wherein the polymeric body or a portion thereof includes a thermochromic composition which has a first colour condition below a first threshold temperature and a second colour condition if the composition is heated above the first threshold temperature, and wherein the thermochromic composition maintains the second colour condition until it is cooled below a second threshold temperature. It will be appreciated that the thermochromic composition has a "colour memory" in which it retains the second colour condition until such time that it is cooled to a temperature which is below the second threshold temperature. The second threshold temperature is suitably a temperature which is below the ordinary operating temperature of the electrical component.

It will be appreciated that the second threshold temperature is below the first threshold temperature.

Such thermochromic compositions have recently been discovered and are described and discussed in WO2017/037282.

However, given the electron nature of the thermochromic composition, the skilled person was unable to determine from WO2017/037282 if such compositions could be used in the body of electrical components on the basis that the body of electrical components must have the properties of an insulator and must therefore not conduct an electrical current. Tests carried out by the applicant have determined that a polymeric body which includes one or more thermochromic compositions maintains the properties of an insulator.

Furthermore, the applicant has established that the addition of the thermochromic composition to a polymer precursor material for use in the moulding of the electrical component body does not in any significant way impair the physical properties of the polymeric body.

In an embodiment of the invention, the thermochromic composition includes a compound having the formula (I):

Formula (I)

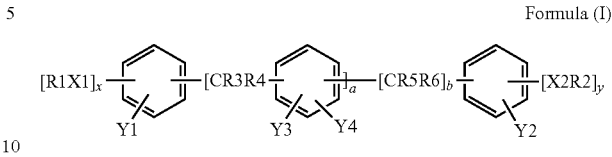

wherein:

R1 and R2 are independently selected from an optionally substituted linear or branched alkyl group, alkenyl group, alkoxy group, aryl group and an alkylene aryl group; optionally having from 5 to 22 or 6 to 22 carbon atoms, such as $C_5$-$C_{22}$ alkyl or $C_1$-$C_{12}$ alkylene or $C_6$-$C_{12}$ aryl (for example $C_6$ alkyl, $C_{10}$ alkyl, $C_{12}$ alkyl, $C_{14}$ alkyl, $C_{16}$ alkyl, $C_1$-$C_4$ alkylene or phenyl);

X1 and X2 are independently selected from —OC(O)—, —CO$_2$— and O, wherein in certain embodiments R1X1 and R2X2 are not —O-alkenyl;

R3, R4 and R5 are independently selected from hydrogen and an optionally substituted linear or branched hydrocarbyl group, for example a $C_1$-$C_{12}$ alkyl group, a $C_2$-$C_{12}$ alkenyl group, a $C_3$-$C_{12}$ cycloalkyl group or a $C_1$-$C_{12}$ alkoxy group, suitably R3, R4 and R5 are each independently selected from hydrogen and $C_1$-$C_4$ alkyl (e.g. methyl);

R6 is selected from hydrogen, halogen, R3, —X1R1 and phenyl, wherein R1 is optionally not aryl, alkenyl or an alkylene aryl group when R6 is —X1R1 and wherein R6 is suitably selected from hydrogen, $C_1$-$C_{10}$ alkyl and —CO$_2$R1, such as for example hydrogen, $C_1$-$C_4$ alkyl or —CO$_2$R1;

Y1, Y2, Y3 and Y4 are independently selected from hydrogen, R3, —OR3 and halogen, wherein —OR3 is optionally not —O-alkenyl; suitably Y1, Y2, Y3 and Y4 are independently selected from hydrogen and $C_1$-$C_4$ alkyl (e.g. methyl);

a is 0 to 4, optionally 1; b is 0 or 1; x and y are independently 0 or 1.

The term "optionally substituted" as used herein means that the group or moiety may be substituted with one or more of the specified substituents. If the substituents are not specified, then they are selected from the following: nitro, chloro, fluoro, bromo, nitrile, hydroxyl, thiol, a carboxylic acid group, a carboxylic ester group, $C_1$-$C_{12}$ alkoxy, $C_1$-$C_{12}$ alkyl, $C_2$-$C_{12}$ alkenyl, $C_6$-$C_{14}$ aryl, $C_1$-$C_6$ alkaryl (where aryl is $C_5$-$C_{14}$ aryl), amino, amino-$C_1$-$C_{12}$ alkyl and amino di($C_1$-$C_{12}$ alkyl).

The term "aryl" includes heteroaromatic groups which contain at least one N, O or S heteroatom in the cyclic moiety.

The aryl groups specified herein are suitably phenyl groups.

In an embodiment of the invention, the thermochromic composition includes a compound having a formula (II):

Formula (II)

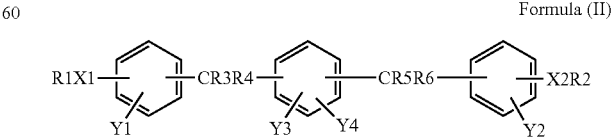

Wherein R1, R2, R3, R4, R5, R6, X1, X2, Y1, Y2, Y3 and Y4 are all as defined hereinabove.

In an embodiment of the invention, R3, R4, R5 and R6 of Formula (II) are each independently selected from hydrogen, an optionally substituted $C_1$-$C_{12}$ alkyl group, an optionally substituted $C_2$-$C_{12}$alkenyl group and an optionally substituted $C_1$-$C_{12}$ alkoxy group. Suitably R3, R4, R5 and R6 of Formula (II) are each independently selected from hydrogen and $C_1$-$C_4$ alkyl.

In a yet further embodiment, R3, R4, R5 and R6 of Formula (II) are each independently selected from hydrogen and methyl, for example, each of R3, R4, R5 and R6 of Formula (II) may be methyl.

The moieties —CR3R4- and —CR5R6- may be in an ortho, meta or para relationship to each other, suitably a para or meta relationship. Furthermore, the moieties —CR3R4- and R1X1-, and the moieties —CR5R6- and R2X2- respectively may be in an ortho, meta or para relationship to each other, for example a para relationship.

In a further embodiment of the invention, the thermochromic composition includes a compound having a formula (IIIa) or (IIIb):

Formula (IIIa)

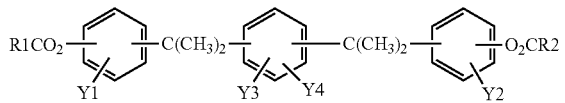

Formula (IIIb)

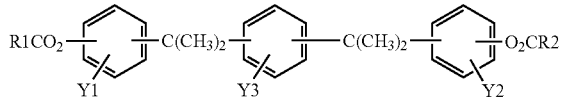

In which Y1, Y2, Y3 and Y4 (where present) are all as defined hereinabove. Suitably, Y1, Y2, Y3, and Y4 are all hydrogen. Furthermore, R1CO$_2$— and —O$_2$CR2 are both in a para position relative to the alkyl bridging groups; and the two —C(CH$_3$)$_2$— moieties are in a para or meta relationship with respect to each other as shown in Formulae (IV) and (V):

Formula (IV)

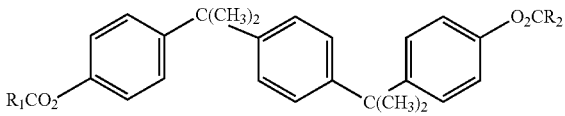

Formula (V)

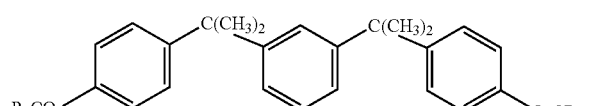

Optionally, R1 and R2 are independently selected from $C_9$-$C_{15}$ alkyl, for example, $C_{10}$ alkyl. In specific embodiments, R1 and R2 are each $C_9$ alkyl, $C_{11}$ alkyl or $C_{15}$ alkyl. Such compounds are particularly useful as a component of the thermochromic composition.

The thermochromic composition suitably includes: (A) an electron donating organic colouring compound; (B) an electron accepting compound; and (C) a compound according to any of Formulae (I) to (V) as defined hereinabove.

With regard to component (A) of the composition, any known electron donating coloured compounds may be used. Examples of suitable general classes of such compounds include indolyles, phthalides, azaphthalides, fluorans, styrylquinolines and diazarhodamine lactones.

Particular examples of Component (A) include 2'-chloro-6-diethylaminofluoran; 6'-(diethylamino)-2'-(phenylamino)-3H-spiro[2-benzofuran-1,9'-xanthen]-3-one; 3-(4-diethylamino-2-hexyloxyphenyl)-3-(1-ethyl-2-methylindol-3-yl)-4-azaphthalide; 3,3-bis(p-dimethylaminophenyl)-6-dimethylaminophthalide; 3-(4-diethylaminophenyl)-3-(1-ethyl-2-methylindol-3-yl)phthalide; 3,3-bis(1-n-butyl-2-methylindol-3yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-diphenylaminofluoran; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylaminofluoran; 2-(3-trifluormethylanilino)-6-diethylaminofluoran; 2-(N-methylanilino)-6-(N-ethyl-N-p-tolylamino)fluoran; 1,3-dimethyl-6-diethylaminofluoran; 2-chloro-3-methyl-6-diethylaminofluoran; 2-anilino-3-methyl-6-diethylaminofluoran; 2-anilino-3-methyl-6-di-n-butylaminofluoran; 2-xylindino-3-methyl-6-diethylaminofluoran; 1-2-benz-6-diethylaminofluoran; 1,2-benz-6-(N-ethyl-N-isobutylamino)fluoran; 1,2-benz-6-(N-ethyl-N-isoamylamino)fluoran; 2-(3-methoxy-4-dodecoxystyryl)quinolone; spiro[5H-(1)benzopyrano(2,3-d)pyrimidine-5,1'(3'H)isobenzofuran]-3'-one; 2-(diethylamino)-8-(diethylamino)-4-methyl-spiro[5H-(1)benzopyrano(2,3-d)pyrimidine-5,1'(3'H)isobenzofuran]-3'-one; 2-(di-n-butylamino)-8-(di-n-butylamino)-4-methyl-spiro[5H-(1)benzopyrano(2,3-d)pyrimidine-5,1'(3'H)isobenzofuran]-3'-one; 2-(di-n-butylamino)-8-(diethylamino)-4-methyl-spiro[5H-(1)benzopyrano(2,3-d)pyrimidine-5,1'(3'H)isobenzofuran]3'-one; 2-(di-n-butylamino)-8-(N-ethyl-N-i-amylamino)-4-methyl-spiro[5H-(1)benzopyrano(2,3-d)pyrimidine-5,1'(3'H)isobenzofuran]-3'-one; 2-(di-n-butylamino)-8-(di-n-butylamino)-4-phenyl-spiro[5H-(1)benzopyrano(2,3-d)pyrimidine-5,1'(3'H)isobenzofuran]-3'-one; 3-(2-methoxy-4-dimethylaminophenyl)-3-(1-butyl-2-methylindol-3-yl)-4,5,6,7-tetrachlorophthalide; 3-(2-ethoxy-4-diethylaminophenyl)-3-(1-ethyl-2-methylindol-3-yl)-4,5,6,7-tetrachlorophthalide; and 3-(2-ethoxy-4-diethylaminophenyl)-3-(1-pentyl-2-methylindol-3-yl)-4,5,6,7-tetrachlorophthalide.

Advantageously, Component (A) is selected from the group 3-(4-diethylamino-2-hexyloxyphenyl)-3-(1-ethyl-2-methylindol-3-yl)-4-azaphthalide; 2-chloro-3-methyl-6-diethylaminofluoran; 6'-(diethylamino)-2'-(phenylamino)-3H-spiro[2-benzofuran-1,9'-xanthen]-3-one; 3,3-bis(1-n-butyl-2-methylindol-3yl)phthalide; and 2-(2-chloroanilino)-6-di-n-butylaminofluoran.

With regard to component (B) of the composition, any known electron accepting group may be used. Examples of suitable classes of compounds include compounds having labile or active protons, pseudo-acidic compounds or electron voids. Examples of classes of compounds having active protons include compounds having phenolic groups, such as mono- and poly-phenols bearing suitable substituents known in the art and their metal salts.

Examples of suitable component (B) compounds include: Phenol; o-cresol; t-butyl catechol; nonylphenol, n-octylphenol; n-dodecylphenol; n-stearylphenol; p-chlorophenol; p-bromophenol; o-phenylphenol, 4,4'-cyclohexylidenebisphenol; n-butyl-p-hydroxybenzoate; n-octyl-p-hydroxybenzoate; resorcin; dodecyl gallate; 2,2-bis(4-hydroxyphenyl)propane; 4,4-dihydroxydiphenylsulfone; 1,1-bis(4-hydroxyphenyl) ethane; 2,2-bis(4-hydroxy-3-methylphenyl) propane; bis(4-hydroxyphenyl) sulphide; 1-phenyl-1,1-bis (4-hydroxyphenyl)ethane; 1,1-bis(4-hydroxyphenyl)-3-methylbutane; 1,1-bis(4-hydroxyphenyl)-2-methylpropane; 1,1-bis(4-hydroxyphenyl)-n-hexane; 1,1-bis(4-hydroxyphenyl)-n-heptane; 1,1-bis(4-hydroxyphenyl)-n-octane; 1,1-bis (4-hydroxyphenyl)-n-nonane; 1,1-bis(4-hydroxyphenyl)-n-decane; 2,2-bis(4-hydroxyphenyl)butane; 2,2-bis(4-hydroxyphenyl)ethyl propionate; 2,2-bis(4-hydroxyphenyl)-4-methylpentane; 2,2-bis(4-hydroxyphenyl) hexafluoropropane; 2,2-bis(4-hydroxyphenyl)-n-heptane; 2,2-bis(4-hydroxyphenyl)-n-nonane; 4,4',4"-methylidenetrisphenol; 2,6-bis[(2-hydroxy-5-methylphenol)methyl]-4-methylphenol; 4,4'-[1-[4-[1-(4-hydroxyphenyl)-1-methylethyl]phenyl]ethylidene]bisphenol; 4,4',4"-methylidenetris [2-methylphenol]; 4,4'-[(2-hydroxyphenyl)methylene]bis[2, 3,6-triphenylphenol]; 2,2-methylene-bis[6-[(2-hydroxy-5-methylphenyl)methyl]-4-methylphenol]; 2,4,6-tris(4-hydroxyphenylmethyl)-1,3-benzendiol; 4,4',4"-ethylidenetrisphenol; 4,4'-[(4-hydroxyphenyl)methylene]bis [2-methylphenol]; 4,4'-[(4-hydroxyphenyl)methylene]bis[2, 6-dimethylphenol]; 4,4'-[(4-hydroxy-3-methoxyphenyl) methylene]bis[2,6-dimethylphenol]; 2,4-bis[(5-methyl-2-hydroxyphenyl)methyl]-6-cyclohexylphenol; 4,4'-[1-[4 [1-(4-hydroxy-3-methylphenol)-1-methylethyl]phenyl] ethylidene]bis[2-methylphenol]; 4,4'-[4-hydroxyphenyl) methylene]bis[2-cyclohexyl-5-methylphenol]; 4,6-bis[(4-hydroxyphenyl)methyl[-1,3-benzendiol; 4,4'-[(3,4-dihydroxyphenyl)methylene]bis[2,6-dimethylphenol]; 4,4'-(1-phenylethylidene)bisphenol; 5,5'-(1-methylethylidene) bis[1-phenyl-2-ol]; 4,4',4"-methylidenetrisphenol; 4,4'-[1-[4-[1-(4-hydroxyphenyl-1-methylethyl]phenyl]ethylidene] bisphenol; 4,4'-(phenylmethylene)bisphenol; 4,4'-[1,4-phenylenebis(1-methylethylidene)]bis[2-methylphenol]; 5,5'-(1,1-cyclohexylidene)bis[1-biphenyl-2-ol]; bis(3-methyl-4-hydroxyphenyl)sulphide; bis(3,5-dimethyl-4-hydroxyphenyl); bis(3-ethyl-4-hydroxyphenyl)sulphide; bis(3, 5-diethyl-4-hydroxyphenyl)sulphide; bis(3-propyl-4hydroxyphenyl)sulphide; bis(3,5-dipropyl-4-hydroxyphenyl)sulphide; bis(3-t-butyl-4-hydroxyphenyl) sulphide; bis(3,5-di-t-butyl-4-hydroxyphenyl)sulphide; bis (3-pentyl-4-hydroxyphenyl)sulphide; bis(3-hexyl-4-hydroxyphenyl)sulphide; bis(3-heptyl-4-hydroxyphenyl) sulphide; and bis(5-octyl-2-hydroxyphenyl)sulphide.

Advantageously, component (B) may be a mixture of at least two of the above-mentioned compounds. Suitably, component (B) may be selected from 2,2-bis(4-hydroxyphenyl)hexafluoropropane; 1,1-bis(4-hydroxyphenyl)-2-methylpropane; and mixtures thereof.

Suitably, the ratio of the components (B) to (C) in parts by weight is in the range 0.5 to 40, optionally 1 to 20. The ratio of the components (A) to (C) in parts by weight is suitably in the range 0.5 to 30, optionally 1 to 20.

It has been found that the inclusion of a non-ionic surfactant in the thermochromic composition may improve stability against colour change when the composition is subjected to pressure in its first colour condition. Accordingly, the thermochromic composition may further include a non-ionic surfactant.

The non-ionic surfactant may be an alkoxylate which has a hydrophobic terminal group, such as a hydrocarbon chain. The hydrocarbon chain may include a $C_1$-$C_{22}$ alkyl group, for example, a $C_7$-$C_{22}$ alkyl group or a $C_9$-$C_{15}$ alkyl group. The alkyl group may be a mixed $C_9/C_{11}$ alkyl group or a mixed $C_{13}/C_{15}$ alkyl group.

Suitable non-ionic surfactants include non-ionic surfactants having a molecular weight of 300 to 1500, such as 500 to 1000. Examples of suitable non-ionic surfactants include those available under the BIOSOFT trade name from Stepan, the LUTENSOL trade name from BASF, the EMULSOGEN and GENAPOL trade names from Clariant and products available under the EMPILAN, HYDRAPOL, SURFONIC, BIONIC and TERIC trade names from Huntsman.

The thermochromic composition is suitably microencapsulated to provide a thermochromic microcapsule pigment by any known method, such as by use of an isocyanate interfacial polymerisation method, a melamine or urea formaldehyde interfacial polymerisation method, a free radical interfacial polymerisation method, the polycondensation of epoxy or a complex coacervation method.

Microencapsulation allows the thermochromic composition to retain its composition when in contact with chemicals (such as the base polymer which forms the body of the electrical component) or heat (such as in the moulding process).

The thermochromic microcapsule pigment may then be added to polymeric particles prior to moulding the desired electrical component. The polymeric material of the electrical component body suitably includes from 1% by weight to 20% by weight of the thermochromic composition In the present invention, the first threshold temperature may be above 40° C., such as above 50° C., above 60° C., above 70° C., or above 80° C. for example. Accordingly, if the electrical component is heated above the first threshold temperature, the thermochromic composition will change from a first colour condition (the "normal" colour condition) to a second colour condition (the "alert" colour condition). The thermochromic composition will retain the second colour condition, even if the electrical component subsequently cools down to below the first threshold temperature. In this way, a visual inspection of the electrical component will reveal if it has been heated to a temperature greater than the first threshold temperature, even if it has subsequently cooled to its normal or room temperature.

In order to return the electrical component to its first colour condition, it must be cooled to a temperature which is below its second threshold temperature. The second threshold temperature may be below 10° C., for example, below 0° C., below −5° C., below −10° C., below −15° C. or below −20° C.

The electrical component is suitably an electrical connector configured to connect two electrical wires, an electrical plug configured to connect an electrical device to a source of electrical power or a clip which may be detachably secured to an electrical wire or cable.

In alternative embodiments in which the electrical component is configured for attachment to an electrical apparatus, the electrical component may include a layer of an adhesive carried by at least a portion of the polymeric body. The adhesive is suitably a contact adhesive and optionally includes a release layer which covers the adhesive layer. In such embodiments, the electrical apparatus may be an electrical plug, an electrical connector or an electrical appliance. Thus, the electrical component in such embodiments may comprise a layer of the polymeric body, a layer of adhesive carried by at least a portion of the polymeric body and a release layer covering or overlying the adhesive layer. In other words, the electrical component may be in the form of a sticker.

As the electrical apparatus to which the electrical component is configured to be attached may include a planar surface, the polymeric body may be substantially planar. However, the electrical apparatus may include a complex shape. Accordingly, the electrical component in this embodiment may be flexible such that it can conform to a complex shape without damage. In other words, the electrical component may be deflected from a "rest" configuration.

The adhesive suitably conduct heat such that heat from the electrical apparatus is transferred to the polymeric body via the adhesive layer. In such embodiments, if a fault with the electrical apparatus causes it to be heated to a temperature above the first threshold temperature, this event is captured and recorded by the electrical component.

In embodiments in which the electrical component is an electrical connector, the connector suitably includes a polymeric body which defines one or more electrical inputs and one or more electrical outputs, wherein the connector body or a portion thereof includes the thermochromic composition and the polymeric body functions as an insulator. The polymeric body of the connector, or the portion thereof that includes the thermochromic composition has a first colour condition and a second colour condition in accordance with the first and second colour conditions of the thermochromic composition defined herein.

In the context of the present invention, the term "insulator" is intended to mean that the body does not conduct a current therethrough under its normal electrical load.

The or each electrical input of the connector is typically a terminal for the connection thereto of one or more electrical wires or cables. Similarly, the or each electrical output of the connector is also typically a terminal for the connection thereto of one or more electrical wires or cables. Such connection terminals are well known in the field of electrical engineering.

In embodiments in which the electrical component is a plug, the plug is suitably includes an insulating polymeric body and one or more male or female connection elements, wherein the or each connection element includes a connector for electrically securing a wire to the respective connection element. Thus, the plug may include one or more electrical wires or cables, wherein each electrical wire/cable is connected to a respective one of the male/female connection elements via the connector. The insulating polymeric body of the plug suitably includes the thermochromic composition such that the plug body has a first colour condition and a second colour condition in accordance with the first and second colour conditions of the thermochromic composition defined herein.

In this embodiment, the thermochromic composition may be dispersed within a polymeric precursor material for the plug body and the plug body is then moulded in the normal way. The relevant male/female connection elements are then added to the plug and the respective electrical wires/cables are secured to the connection elements to form a completed plug assembly.

In embodiments in which the electrical component is a clip which is configured for attachment to an electrical wire or cable, the clip may comprise an annular polymeric body or it may comprise a C-shaped polymeric body portion. The skilled person will appreciate that both options for the clip body suitably form a friction fit around the circumference of a cable/wire (in the case of the annular body) or around a portion of the circumference of the wire/cable (in the case of a clip having a C-shaped body portion). In both cases, the polymeric body is suitably resiliently deformable.

Clips having a C-shaped body portion may be push-fit onto existing wiring/cables without the need to disconnect the wire/cable. In order to assist with the push-fit process, the opposed ends of the C-shaped body may be outwardly flared. In this way, as the C-shaped body is urged towards the cable/wire, the opposed ends are urged outwards until the clip has passed the diameter of the cable/wire, after which time, the resiliently deformable nature of the polymeric body causes the body to snap-fit around a circumferential portion of the cable/wire.

To further assist the engagement of the C-shaped clip to the cable/wire, the C-shaped body may include a radially outwardly projecting handle portion. The outwardly projecting handle portion permits a user to hold the clip via the handle portion and simply urge it forwards over a circumferential portion of the cable/wire. In addition, owing to the relatively poor heat conductivity of the polymeric material, the handle portion may retain the first colour condition when the C-shaped body changes to the second colour condition. This contrast in colours between the C-shaped body (second colour condition) and the handle portion (first colour condition) provides a further visual indication of a possible fault and overheating of the cable/wire.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

Embodiments of the invention will now be described, by way of example only, with reference to the accompanying drawings in which.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

Figure 1:
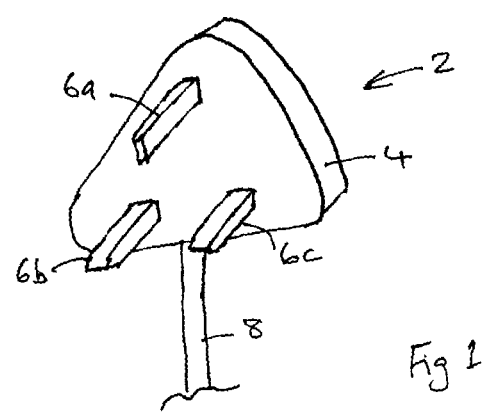
FIG. 1 is a perspective view of a plug according to a first embodiment of the invention.

FIG. 1 shows a plug 2 which includes a body 4 formed from a nylon polymer material, three metal male connection pins 6a, 6b, 6c which project from the body and an electrical cable 8 comprising therein three separate electrical wires (not shown), each of which is connected to a respective one of the male connection pins 6a, 6b, 6c. This is a typical arrangement for a 3-pin plug.

Prior to moulding the plug body 4, the nylon polymer pellets were mixed with 10% by weight of an encapsulated thermochromic composition such that the encapsulated thermochromic composition was dispersed within the nylon polymer pellets. After the plug had been moulded, it was cooled to 4° C. (the second threshold temperature). After cooling, the plug had a magenta colour.

The thermochromic composition was as follows:

4 parts by weight of 3,3-bis(1-n-butyl-2-methylindol-3-yl)phthalide (Component (A)) available from Yamamoto Chemicals; 6 parts by weight of 2,2-bis(4'-hydroxyphenyl) hexafluoropropane and 6 parts by weight of 1,1-bis(4'hydroxyphenyl)-2-methylpropane (together forming Component (B)) available from Sigma Aldrich and 84 parts by weight of 4,4'-[1,4-phenylenebis(1-methylethylidene)]bis(4-phenyldodecanoate) (Component (C)) having the following formula:

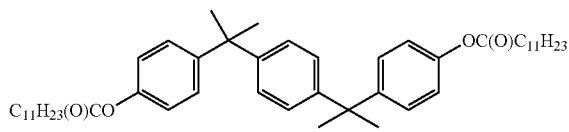

The resulting thermochromic composition changed colour from magenta in its normal operating condition to a pale pink colour when it was heated above its first threshold temperature.

100 parts by weight of the composition was dispersed in 100 parts by weight of a 10% solution of methyl vinyl ether-maleic anhydride copolymerised resin neutralised with sodium hydroxide to a pH of 4 via a high speed homogeniser. 25 parts by weight of a melamine formaldehyde resin was added and the resultant emulsion stirred for 6 hours at a temperature of 80° C.

The dispersion was then drum dried and the pigment was isolated in encapsulated form. The encapsulated pigment particles had an average particle size of 2.5 microns.

The plug retains its magenta colour up to a temperature of about 60° C. (the first threshold temperature). After this temperature, the colour changes to a pale pink colour. Once heated beyond 60° C., the plug retains its pale pink colour down to a temperature of about 18° C., after which, the magenta colour starts to return.

The skilled person will appreciate from WO2017/037282 that the thermochromic composition can be "tuned" to provide a desired colour change and the desired first threshold temperature and second threshold temperature. Various different thermochromic pigments are described and discussed in WO2017/037282

Furthermore, WO2017/037282 teaches how to make the components (A), (B) and (C) of the thermochromic composition and how to encapsulate them into pigment particles which can then be used to colour moulded polymeric materials.

Figure 2:
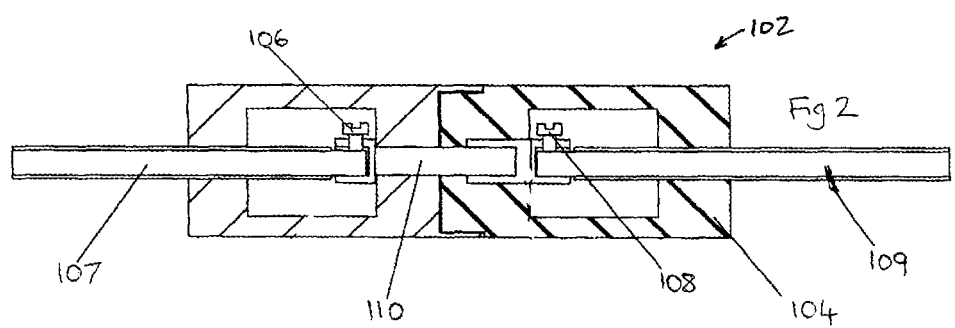
FIG. 2 is a cross-sectional view through an electrical connector according to a second embodiment of the invention.

FIG. 2 shows an electrical component in the form of an electrical connector 102. The electrical connector 102 includes an insulating polymeric body 104 which defines therein a first electrical terminal 106 which is configured to receive an end of a first electrical wire 107 therein; and a second electrical terminal 108 which is configured to receive therein an end of a second electrical wire 109. The first electrical terminal 106 is electrically connected to the second electrical terminal 108 via a conductive element 110 which passes between the terminals 106, 108 through the body 104.

Electrical connectors of the type shown in FIG. 2 and described hereinabove are well known to those skilled in the art.

The insulating polymeric body 104 of the connector 102 is formed from a nylon polymer which includes 10% by weight of the thermochromic composition described above in connection with the plug shown in FIG. 1. Accordingly, the insulating polymeric body 104 of the electrical connector shown in FIG. 2 undergoes the same colour changes at substantially the same transition temperatures.

Figure 3A:
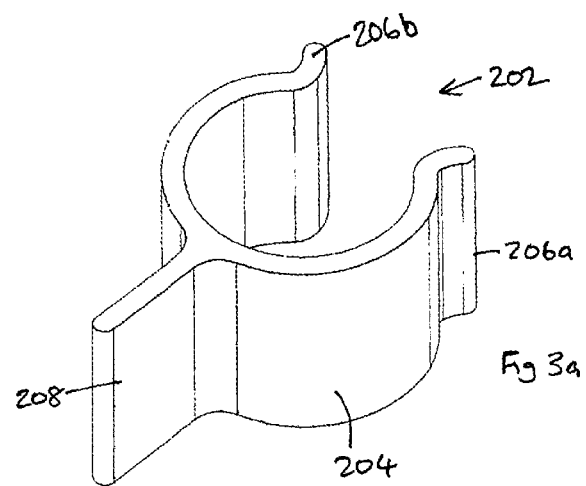
FIG. 3a is a perspective view of a cable clip according to a third embodiment of the invention.
Figure 3B:
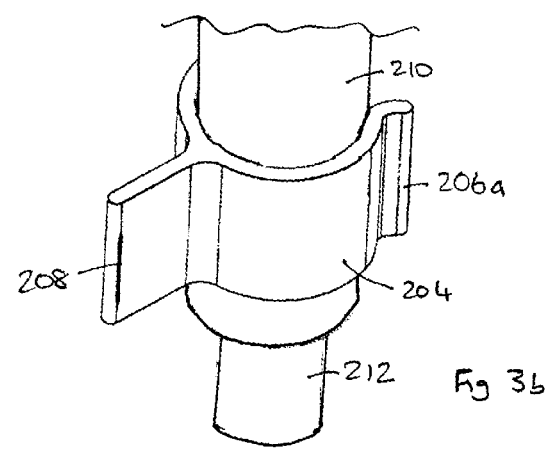
FIG. 3b is a perspective view of the clip shown in FIG. 3a located around the insulating sheath of an electrical cable.

FIGS. 3a and 3b show an electrical component in the form of a clip 202 which is configured for attachment to an electrical cable. The clip 202 includes a C-shaped insulating body portion 204. The opposed ends 206a, 206b of the body portion 204 flare outwards. The C-shaped body portion 204 is formed from polypropylene and is resiliently deformable.

The radius of the curved portion of the body 204 is slightly smaller than the corresponding radius of the electrical cable around which the clip 202 is configured to fit.

The C-shaped body portion 204 has extending away from it, opposite to the ends 206a, 206b, a handle portion 208.

The clip 202 is formed as a one-piece moulded component from polypropylene which includes 10% by weight of the thermochromic composition described above in connection with the embodiment shown in FIG. 1.

It will be appreciated that the body 204 can have any desired radius for attachment to electrical cables having a corresponding radius.

In use, a user holds the clip 202 via its handle portion 208 and urges it towards a cable 210 (shown in FIG. 3b), suitably near a junction or connection for the cable. FIG. 3b shows an exposed metal core 212 of the cable prior to insertion into a connection terminal (not shown). As the opposed ends 206a, 206b of the body 204 contact the peripheral surface of the cable 210, their flared-out shape causes the arms of the C-shaped body 204 to deflect outwards, thereby increasing the gap defined between the opposed ends 206a, 206b. When the gap between the opposed ends 206a, 206b is equal to the diameter of the cable 210, the clip body is able to snap fit over a circumferential portion of the cable 210, with the resiliently nature of the C-shaped body 204 urging the body into a frictional engagement with the outer sheath of the cable 210. As a result of this frictional engagement, the clip 202 remains in the location in which it was placed by the user.

If the cable 210 experiences a temperature which is greater than the first threshold temperature of 60° C. as a result of a breakdown in the cable or in the connection or terminal adjacent to the location of the clip 202, the clip 202 will change colour to pale pink and that colour will be fixed until such time that the clip is subjected to a temperature which is below the second threshold temperature of 4° C., at which point the magenta colour is fully returned. In this way, the clips can be re-used. For example, if there is an electrical fault associated with the cable 210 to which the clip 202 is secured and the clip 202 indicates an elevated temperature, the cable or its associated connector/terminal can be repaired. The clip 202 can then be cooled to 4° C., at which point the "normal" magenta colour is restored and the clip can then be re-applied to the repaired cable and re-used.

In a further embodiment of the invention which is not shown in the Figures, a nylon disc having a diameter of 5 cm and a thickness of 2 mm is moulded. Similar to the embodiments described above, prior to moulding the nylon disc, the nylon polymer pellets were mixed with 10% by weight of the encapsulated thermochromic composition described above such that the encapsulated thermochromic composition was dispersed within the nylon polymer pellets. After the disc had been moulded, it was cooled to 4° C. (the second threshold temperature). After cooling, the disc had a magenta colour.

A thermally conductive silicone adhesive is applied to one surface of the disc and the adhesive layer is then covered with a release paper.

The disc is flexible and may be adhered to a desired surface of an electrical apparatus via the silicone adhesive layer after the release paper has been removed.

The invention claimed is:
1. An electrical component comprising:
a polymeric body
configured for attachment to an electrical cable or wire;
wherein the polymeric body or a portion thereof includes
a thermochromic composition which has a first color condition below a first threshold temperature and a second color condition if the composition is heated above the first threshold temperature, wherein the thermochromic composition maintains the second color condition until it is cooled below a second threshold temperature; and wherein the electrical component is a clip and the polymeric body is insulating and annular or C-shaped.

2. An electrical component according to claim 1, wherein the second threshold temperature is at least 30° C. below the first threshold temperature.

3. An electrical component according to claim 1, wherein the first threshold temperature is 50° C. or greater.

4. An electrical component according to claim 1, wherein the polymeric body comprises from 1% to 20% by weight of the thermochromic composition.

5. An electrical component according to claim 1, wherein the insulating polymeric body is C-shaped and the opposed ends of the body flare outwards.

6. An electrical component according to claim 5, wherein the C-shaped body includes an outwardly projecting handle portion.

7. An electrical component according to claim 1, wherein the thermochromic composition includes a compound having the formula (I):

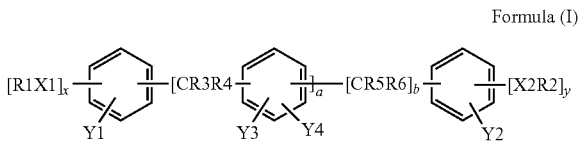

Formula (I)

wherein:
R1 and R2 are independently selected from an optionally substituted linear or branched alkyl group, alkenyl group, alkoxy group, aryl group and an alkylene aryl group; each having from 5 to 22 carbon atoms;

X1 and X2 are each independently selected from —OC(O)—, —CO$_2$— and O;

R3, R4 and R5 are each independently selected from hydrogen and an optionally substituted linear or branched hydrocarbyl group having from 1 to 12 carbon atoms;

R6 is selected from hydrogen, halogen, R3, —X1R1 and phenyl;

Y1, Y2, Y3 and Y4 are independently selected from hydrogen, R3, —OR3 and halogen;

a is 0 to 4, optionally 1; b is 0 or 1; and x and y are independently 0 or 1.

8. An electrical component according to claim 7, wherein the thermochromic composition further includes an electron donating organic coloring compound and an electron accepting compound.

9. An electrical component according to claim 8, wherein the electron donating organic coloring compound is an indolyl compound, a phthalide compound, an azaphthalide compound, a fluoran compound, a styrylquinoline compound or a diazarhodamine lactone compound.

10. An electrical component according to claim 9, wherein the ratio by weight of the electron donating organic coloring compound to the compound of Formula (I) is from 0.5 to 30.

11. An electrical component according to claim 7, wherein the electron accepting compound is a monophenol compound, a polyphenol compound, a mixture of monophenol and/or polyphenol compounds or their metal salts.

12. An electrical component according to claim 11, wherein the ratio by weight of the electron accepting compound to the compound of Formula (I) is from 0.5 to 40.

13. An electrical component according to claim 7, wherein the thermochromic composition further includes a non-ionic surfactant.

* * * * *